(12) United States Patent
Obata et al.

(10) Patent No.: US 7,655,343 B2
(45) Date of Patent: Feb. 2, 2010

(54) LIQUID FUEL SUPPLY TYPE FUEL CELL

(75) Inventors: Takeshi Obata, Tokyo (JP); Tsutomu Yoshitake, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 909 days.

(21) Appl. No.: 10/528,337

(22) PCT Filed: Sep. 19, 2003

(86) PCT No.: PCT/JP03/11984

§ 371 (c)(1),
(2), (4) Date: Mar. 18, 2005

(87) PCT Pub. No.: WO2004/027916

PCT Pub. Date: Apr. 1, 2004

(65) Prior Publication Data

US 2006/0035131 A1    Feb. 16, 2006

(30) Foreign Application Priority Data

Sep. 20, 2002    (JP)    ............... 2002-276067

(51) Int. Cl.
*H01M 4/00*    (2006.01)
(52) U.S. Cl. ............... 429/41; 429/40; 429/34
(58) Field of Classification Search ............... None
See application file for complete search history.

(56) References Cited

U.S. PATENT DOCUMENTS 6,309,769 B1 *    10/2001    Haug ................... 429/13

FOREIGN PATENT DOCUMENTS

| JP | 60-23977 | 2/1985 |
|---|---|---|
| JP | 63-236516 | 10/1988 |
| JP | 1-213965 | 8/1989 |
| JP | 3-216963 | 9/1991 |
| JP | 4-33269 | 2/1992 |
| JP | 4-206160 | 7/1992 |
| JP | 6-140067 | 5/1994 |
| JP | 7-302609 | 11/1995 |
| JP | 2001-276555 | 10/2001 |

OTHER PUBLICATIONS

Toshiyuki Ohsakai, Kenji Kanoh and Susumu Kuwabatake "Basic Electrochemistry" pp. 87-95, 1$^{st}$ edition, Kagaku-Dojin PublishIng Company, Inc. (Sep. 2000).

* cited by examiner

*Primary Examiner*—Patrick Ryan
*Assistant Examiner*—Cynthia Lee
(74) *Attorney, Agent, or Firm*—Young & Thompson

(57) ABSTRACT

A fuel cell (100) which has an electrode-electrolyte joined article (101) composed of a fuel electrode (102), an oxidizing agent electrode (108) and, sandwiched thereby, a solid polymer electrolyte (114), characterized in that a separation film (330) comprising a material exhibiting an oxygen/nitrogen separation factor of more than 1 is provided on the surface of an oxidizing agent electrode side current collector (110) constituting the oxidizing agent electrode (108). The fuel cell is a liquid fuel supply type of fuel cell which has a simple structure and also is capable of supplying satisfactory oxygen to an oxidizing agent electrode.

13 Claims, 2 Drawing Sheets

LIQUID FUEL SUPPLY TYPE FUEL CELL

TECHNICAL FIELD

The present invention relates to a liquid fuel supply type fuel cell using organic compounds as its fuel.

RELATED ART

A polymer electrolyte fuel cell is a device including as an electrolyte a film of a polymer electrolyte such as a film of perfluorosulfonic acid in which an anode electrode and a cathode electrode are fixed respectively on both surfaces of the film such that fuel such as hydrogen is supplied to the anode electrode while an oxidant such as oxygen is supplied to the cathode electrode to generate electricity using an electrochemical reaction. Recently, research and development has been enthusiastically conducted for a fuel cell using an organic compound such as methanol as fuel. Examples of the fuel cells include a fuel cell in which an organic compound is reformed into hydrogen gas to be used as fuel and a fuel cell represented by a direct methanol fuel cell in which organic liquid fuel is not reformed and is directly supplied to the anode electrode. Among the fuel cells, the latter fuel cell is configured to directly supply organic liquid fuel such as methanol to the anode electrode, and hence does not require a device such as a reforming device. Therefore, the cell configuration can be simplified, and there is an advantage in that the overall device can be reduced in size. Moreover, as compared with gaseous fuel such as hydrogen gas and hydrocarbon gas, the organic liquid fuel has a feature superior in such points as safety and portability. Therefore, it is expected that such a fuel cell using organic liquid fuel will be mounted on small-sized portable devices such as a cellular phone, a notebook-sized personal computer, and a personal digital assistance (PDA) in the future.

Electrochemical reactions shown in the anode electrode and the cathode electrode of the direct methanol fuel cell are expressed by following reaction formulas (1) and (2):

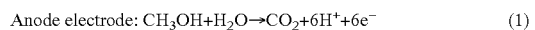

Anode electrode: $CH_3OH + H_2O \rightarrow CO_2 + 6H^+ + 6e^-$ (1)

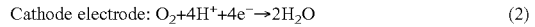

Cathode electrode: $O_2 + 4H^+ + 4e^- \rightarrow 2H_2O$ (2)

In the anode electrode and the cathode electrode, there is provided a mixture including carbon particles carrying catalytic substance and polymer electrolyte. Generally, in the construction, the mixture is coated on an electrode substrate such as carbon paper serving as a fuel gas diffusion layer. The polymer electrolyte film is sandwiched between these two electrodes and hot-pressed thereto to construct a fuel cell.

In the fuel cell, methanol supplied to the anode electrode passes through pores of the electrode to reach the catalyst to generate electrons, protons, and carbon dioxide as above reaction formula (1). The electrons pass through the carbon particles and the solid electrolyte of the anode electrode to be led to an external circuit and then flow into the cathode electrode from the external circuit.

On the other hand, the protons pass through the polymer electrolyte of the anode electrode and the polymer electrolyte film disposed between both electrodes to reach the cathode electrode. The protons react with oxygen supplied to the cathode electrode and electrons flowing from the external circuit to generate water as shown by reaction formula (2). Resultantly, electrons flow from the anode electrode to the cathode electrode in the external circuit, and electric power is obtained.

As the oxidant supplied to the cathode electrode, oxygen contained in air is used in general. It has been known that the higher an partial pressure of oxygen in the air is, the more improved the power of the fuel cell is (nonpatent article 1). To increase the oxygen partial pressure, there has been proposed provision of an oxygen separation membrane module in the fuel cell to increase oxygen density (patent article 1). However, since such a fuel cell is required to secure a space to install the oxygen separation membrane module, it is difficult to mount the fuel cell on a small-sized device. Furthermore, patent article 2 describes a method to supply oxygen-enriched air to the fuel cell by using an oxygen enrichment membrane. However, any concrete disclosure regarding the oxygen enrichment membrane has not been made.

[Patent article 1]
Japanese Patent Application laid open No. 2001-27655
[Patent article 2]
Japanese Patent Application laid open No. HEI1-213965
[Nonpatent article 1]
Toshiyuki Ohsakai, Kenji Kanoh, Susumu Kuwabatake "Basic Electrochemistry", 1st edition, Kagaku-Dojin Publishing Company, INC., September 2000, pp. 87-95

PROBLEM THAT THE INVENTION IS TO SOLVE

It is therefore an object of the present invention to provide a liquid fuel supply type fuel cell of a simple configuration capable of supplying sufficient oxygen to the cathode electrode.

DISCLOSURE OF THE INVENTION

In accordance with an aspect of the present invention, to solve the above problem, there is provided a liquid fuel supply type fuel cell comprising a solid electrolyte film, an anode electrode disposed on one surface of the solid electrolyte film, a cathode electrode disposed on the other surface of the solid electrolyte film, and a passage for feeding air to the cathode electrode, wherein an separation membrane including a material having an oxygen/nitrogen separation coefficient more than one is disposed between the cathode electrode and the passage.

Additionally, in accordance with another aspect of the present invention, in the liquid fuel supply type fuel cell described above, the separation membrane is disposed to cover the surface of the cathode electrode.

The liquid fuel supply type fuel cell in accordance with the present invention is a fuel cell which generates electric power while directly supplying liquid fuel to the anode electrode. A direct methanol type fuel cell is one mode of the liquid fuel supply type fuel cell. Herein, the oxygen/nitrogen separation coefficient is a value expressed by $P_{O2}/P_{N2}$ where $P_{O2}$ is the oxygen transmission coefficient and $P_{N2}$ is the nitrogen transmission coefficient. A separation membrane including a material having an oxygen/nitrogen separation coefficient more than one has a property that oxygen is more easily passed therethrough than nitrogen.

Since the fuel cell of the present invention includes the above separation membrane, air in which the oxygen partial pressure is increased is supplied to the cathode electrode. Therefore, a fuel cell of high power is implemented. Moreover, the fuel cell of the present invention does not require space for anything other than the fuel cell itself. Therefore, even when the fuel cell is mounted in a small-sized device or the like, the limited space can be efficiently used.

Moreover, in accordance with another aspect of the present invention, in the liquid fuel supply type fuel cell described above, the separation membrane is a polysiloxane-based polymer film or a polyimide-based polymer film.

By selecting, as the separation membrane, the material through which oxygen passes easier than nitrogen, power of the fuel cell can be increased.

Further, in accordance with yet another aspect of the present invention, in the liquid fuel supply type fuel cell described above, the separation membrane is a polyorganosiloxane-based polymer film.

The above polymer film has a property to selectively pass oxygen therethrough and a property to pass water vapor therethrough. Therefore, it is possible to discharge excessive water from the cathode electrode while high-density oxygen is supplied to the cathode electrode, and hence a high-power fuel cell capable of stable generation of electricity is implemented.

Still further, in accordance with yet another aspect of the present invention, in the liquid fuel supply type fuel cell described above, the separation membrane includes a material having an oxygen/nitrogen separation coefficient equal to or more than two.

In this way, a fuel cell of higher power can be implemented.

Still further, in accordance with yet another aspect of the present invention, in the liquid fuel supply type fuel cell described above, the separation membrane includes a material having a water vapor transmission coefficient equal to or more than $0.6 \times 10^{-6}$ cm$^3$(STP)cm/cm$^2$·sec·cmHg.

By selecting such separation membrane, water is efficiently removed from the cathode electrode. As a result, electrode reaction in the cathode electrode is efficiently conducted, and hence this can contributes to stable generation of electricity in the fuel cell. Herein, cm$^3$(STP) indicates the gas volume under one atmospheric pressure at 0° C.

Furthermore, in accordance with yet another aspect of the present invention, in the liquid fuel supply type fuel cell described above, the liquid fuel supplied to the anode electrode is methanol.

The fuel cell of the present invention using methanol with satisfying portability and safety as fuel can be suitably applied to small-sized portable devices such as a cellular phone, a notebook-sized personal computer, a PDA, various cameras, a navigation system, and a portable music reproducing player.

Figure 1:
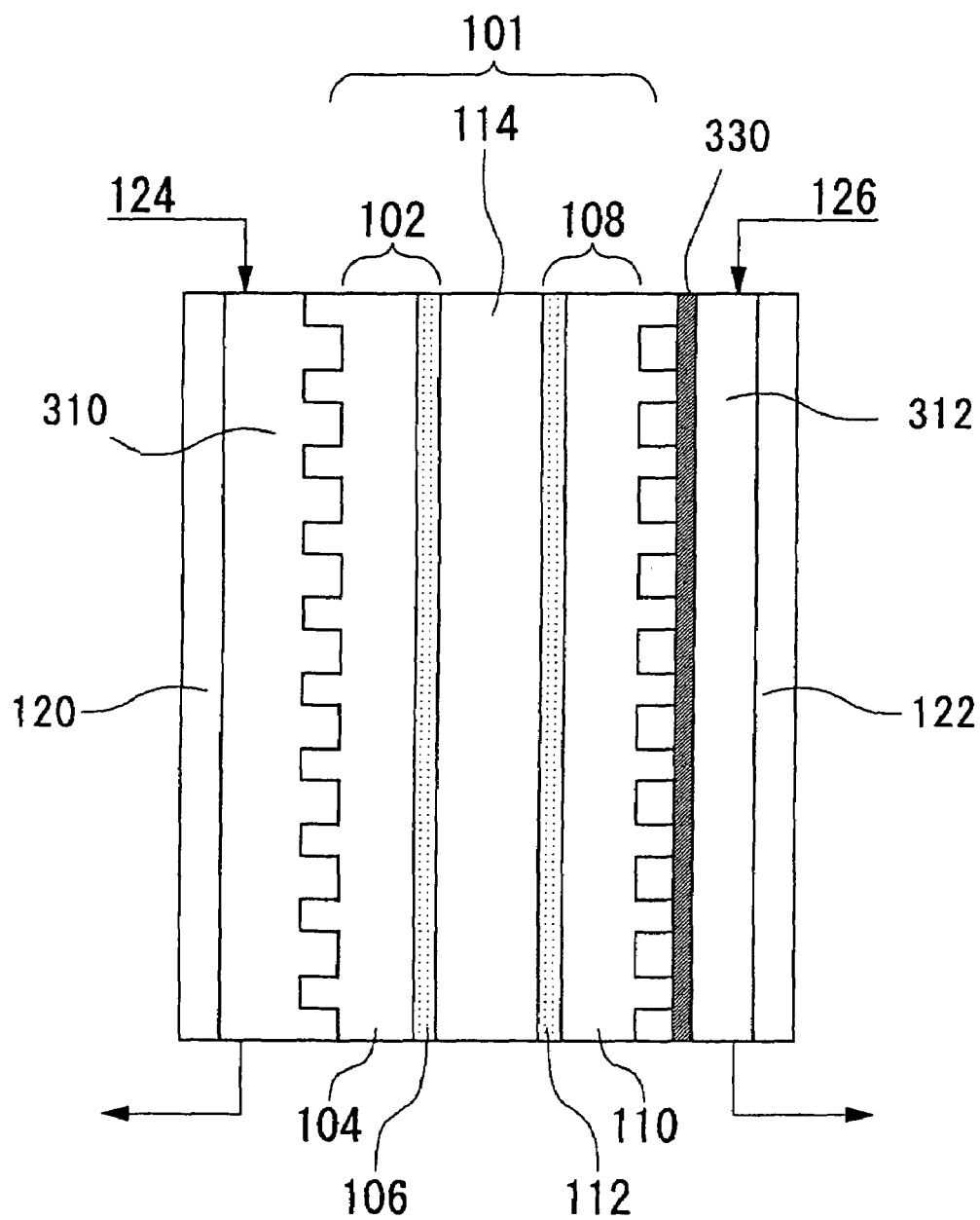
FIG. 1 is a schematic diagram showing a configuration of a fuel cell in accordance with an embodiment of the present invention.

Incidentally, the reference numeral 100 represents a fuel cell. The reference numeral 101 represents a membrane-electrode assembly. The reference numeral 102 represents an anode electrode. The reference numeral 104 represents an anode electrode side diffusion layer. The reference numeral 106 represents an anode electrode side catalyst layer. The reference numeral 108 represents a cathode electrode. The reference numeral 110 represents a cathode electrode side diffusion layer. The reference numeral 112 represents a cathode electrode side catalyst layer. The reference numeral 114 represents a polymer electrolyte film. The reference numeral 120 represents an anode electrode side separator. The reference numeral 122 represents a cathode electrode side separator. The reference numeral 124 represents fuel. The reference numeral 126 represents an oxidant. The reference numeral 310 represents a fuel passage. The reference numeral 312 represents an oxidant passage. The reference numeral 330 represents a separation membrane. The reference numeral 331 represents an adhesive.

BEST MODE FOR CARRYING OUT THE INVENTION

FIG. 1 is a cross-sectional view of a fuel cell 100 according to an embodiment of the present invention. A membrane-electrode assembly (MEA) 101 includes an anode electrode 102, a cathode electrode 108, and a polymer electrolyte film 114. The anode electrode 102 includes an anode electrode side diffusion layer 104 and an anode electrode side catalyst layer 106. The cathode electrode 108 includes a cathode electrode side diffusion layer 110 and a cathode electrode side catalyst layer 112. The anode electrode side diffusion layer 104 and the cathode electrode side diffusion layer 110 have a large number of pores, respectively, not shown in the drawing. On the surface of the diffusion layer 110 where the catalyst layer 112 is not disposed, a separation membrane 330 is disposed.

A plurality of sets of the junction unit 101 and the separation membrane 330 are stacked in layers with a separator 120 and a separator 122 therebetween to be electrically connected to each other, thereby forming a fuel cell stack. Between the separator 120 and the diffusion layer 104, a fuel passage 310 through which fuel 124 flows is disposed. Besides, between the separator 122 and the diffusion layer 104, an oxidant passage 312 through which an oxidant 126 flows is disposed.

In the above fuel cell 100, the fuel 124 is supplied via the fuel passage 310 to the anode electrode 102 of the junction unit 101. The fuel 124 passes through pores of the diffusion layer 104 to reach the catalyst layer 106 to be subjected to the reaction represented by reaction formula (1) described above. As a result, protons, electrons, and carbon dioxide are generated. The protons transfer through the polyelectrolyte film 114 to the cathode electrode 108. The electrons transfer via the diffusion layer 104 and an external circuit to the cathode electrode 108.

On the other hand, the oxidant 126 such as air is supplied via the oxidant passage 312 and the separation membrane 330 to the cathode electrode 108 of the junction unit 101. Oxygen contained in the oxidant 126 reacts, as indicated by reaction formula (2) described above, with the protons and electrons which have been generated in the anode electrode 102 and transferred to the cathode electrode 108 as above to generate water. Thus, electrons flow through the external circuit from the anode electrode to the cathode electrode, and electric power is obtained.

In the configuration, as the separation membrane 330, a membrane having a property to easily pass oxygen and not to easily pass nitrogen molecules therethrough is employed. By this means, the oxidant 126 led to the oxidant passage 312 passes through the separation membrane 330 to resultantly increase oxygen density of the oxidant 126. Consequently, power of the fuel cell 100 is improved. A membrane with an oxygen/nitrogen separation coefficient more than one, preferably two or more, is used as the separation membrane 330.

Examples of the films satisfying the above condition include a polysiloxane-based polymer film and a polyimide-based polymer film. As the polysiloxane-based polymer may be cited polyorganosiloxane-based polymer such as polydimethylsiloxane-based polymer, polydiethylsiloxane-based polymer, and polydiphenylsiloxane-based polymer, for example, Silastic (registered trademark) of Dow Coning Corporation and Silopren (registered trademark) of GE Bayer Silicones. With these materials, films are formed in known methods, for example, the sol-gel method, the dry-wet film forming method, the liquid-surface film forming method, and the polymer-solution coating method. Besides, it is also possible to form a hybrid film by mixing another material, for example, a fluorine-based material with any one of the above materials. By this means, an separation membrane 330 having excellent mechanical strength can be obtained. Also, for example, Capton (registered trademark) of DuPont-Toray Co., Ltd., Upilex (registered trademark) of Ube Industries, Ltd. or the like can be used as the polyimide-based polymer films.

The separation membrane 330 desirably has a film thickness of at least 0.01 μm to selectively pass oxygen therethrough and more desirably has a film thickness of at least 0.1 μm. On the other hand, to maintain appropriate transfer efficiency of the oxidant 126, the thickness is favorably 1 μm or less.

Incidentally, the polysiloxane-based polymer film may be insufficient in strength if its film thickness is small. In such a case, to increase the strength, the separation membrane 330 may be produced by coating a porous film of, for example, fluorine-based material such as polytetrafluoroethylene with a polysiloxane-based polymer.

Since aqueous solution of an organic compound is used as the fuel in the liquid fuel supply type fuel cell, a large amount of water transfers from the anode electrode 102 side to the cathode electrode 108 side. Additionally, water molecules are generated on the cathode electrode 108 side as indicated by reaction formula (2). Therefore, it is required for the cathode electrode 108 side to discharge such water from the cell system. For that reason, desirably, the separation membrane 330 also has a property to easily pass water molecules therethrough. In this regard, Table 1 shows transmission coefficients of oxygen, nitrogen, and water vapor with respect to materials having an oxygen/nitrogen transmission coefficient more than one.

TABLE 1

| | Transmission coefficient ($cm^3$(STP)cm/$cm^2 \cdot sec \cdot cmHg$) | | |
|---|---|---|---|
| | Oxygen | Nitrogen | Water vapor |
| Polysiloxane base | $6 \times 10^{-8}$ | $3 \times 10^{-8}$ | $4 \times 10^{-6}$ |
| Polyimide base | $1 \times 10^{-11}$ | $<1 \times 10^{-11}$ | $6 \times 10^{-8}$ |
| Polyphosphazene base | $1 \times 10^{-8}$ | $5 \times 10^{-9}$ | $2\text{-}3 \times 10^{-9}$ |

For the separation membrane 330 having a film thickness within the range described above, it is desirable that its material has a water vapor transmission coefficient Pw satisfying formula (1) below for the following reason.

$$Pw \geq 0.6 \times 10^{-6} \, cm^3(STP)cm/cm^2 \cdot sec \cdot cmHg \quad (1)$$

The portable device requires a current of about 500 mA, and to secure the current value, it is required for the water vapor from the cathode electrode to have a transmission speed of at least $6 \times 10^{-3} \, cm^3(STP)cm/cm^2 \cdot sec \cdot cmHg$.

In this situation, formula (2) holds as below:

$$Qw = Pw \cdot \Delta p / t \quad (2)$$

where Qw is the quantity of transmitted water vapor per unit area of the separation membrane, $\Delta p$ is the pressure difference between both surfaces of the separation membrane, and t is the film thickness of the separation membrane.

In the fuel cell for portable devices, air is fed by a blower or the like, and hence $\Delta p$ is about 0.1 atmospheric pressure. Furthermore, the transmission speed of water vapor can be expressed by Pw/t.

Therefore, to secure $Pw/t \geq 6 \times 10^{-3} \, cm^3(STP)cm/cm^2 \cdot sec \cdot cmHg$, it is required to satisfy $Pw \geq 0.6 \times 10^{-6} \, cm^3(STP)cm/cm^2 \cdot sec \cdot cmHg$, i.e., formula (1), for t=1 μm. Referring to Table 1, only the polysiloxane-based materials satisfy formula (1). Therefore, judging from this point of view, it is favorable to select the polysiloxane-based polymer.

The oxygen density of air is about 21 vol %, but can be increased to about 40 vol % by use of the separation membrane 330 described above.

The polymer electrolyte film 114 has a function of separating the anode electrode 102 from the cathode electrode 108 and transferring protons therebetween. Therefore, the polymer electrolyte film 114 is favorably a film having high proton conductivity. Additionally, it is favorable that the film is chemically stable and has high mechanical strength. As materials to configure the polymer electrolyte film 114, there are favorably employed an organic polymer having polar group such as a strong acid group including a sulfone group, a phosphoric acid group, a phosphone group, and a phosphine group or a weak acid group including a carboxyl group.

As the diffusion layers 104 and 110, porous substrates of carbon paper, molded carbon, sintered carbon, sintered metal, and form metal can be adopted. On the surfaces of the diffusion layer 104, surface treatment may be conducted with hydrophilic coating material or hydrophobic coating material.

As the catalyst of the anode electrode 102, it is possible to use, for example, platinum, an alloy of platinum and ruthenium, an alloy of platinum and gold, and an alloy of platinum and rhenium, rhodium, palladium, iridium, osmium, ruthenium, rhenium, gold, silver, nickel, cobalt, lithium, lanthanum, strontium, and yttrium. On the other hand, materials for the catalyst of the anode electrode 102 can be used as those of the catalyst of the cathode electrode 108. In this connection, the same material or different materials may be used for the electrodes 102 and 108.

As examples of the carbon particles to carry the catalyst may be cited acetylene black (Denka Black (registered trade name) made by Denki Kagaku Kogyo Kabushiki Kaisha, XC72 made by Vulcan Material Company, etc.), Ketchen black, carbon nanotube, and carbon nanohorn. The carbon particles have a particle diameter of, for example, 0.01 to 0.1 μm, preferably, 0.02 to 0.06 μm.

As the fuel of the fuel cell in accordance with the embodiment, there can be used organic liquid fuel, for example, methanol, ethanol, and dimethylether.

Although the production method of the fuel cell 100 of the embodiment is not particularly limited, the cell can be produced, for example, as below.

The catalyst is first carried by the carbon particles. This process can be achieved by an impregnation method generally employed. Next, the carbon particles carrying the catalyst and solid polyelectrolytic particles such as Nafion (registered trademark, made by DuPont) are dispersed in a solvent into a paste-like mixture. Thereafter, the paste is coated on the substrate to be then dried to resultantly obtain a catalyst layer. After the paste is coated, the substrate is heated at a heating temperature for a heating period of time associated with a fluororesin used to thereby produce the anode electrode 102 or the cathode electrode 108.

The polymer electrolyte film 114 can be produced in an appropriate method according to materials employed. For example, solution obtained by dissolving or dispersing a organic polymer material in a solvent is cast onto a peeling sheet or the like of polytetrafluoroethylene, etc. and is then dried to obtain the film 114.

The polymer electrolyte film 114 produced as above is sandwiched between the anode electrode 102 and the cathode electrode 108, which is then hot pressed to obtain a membrane-electrode assembly. In this situation, the surfaces of both the electrodes on which the catalyst is disposed are brought into contact with the electrolyte film 114.

Figure 2:
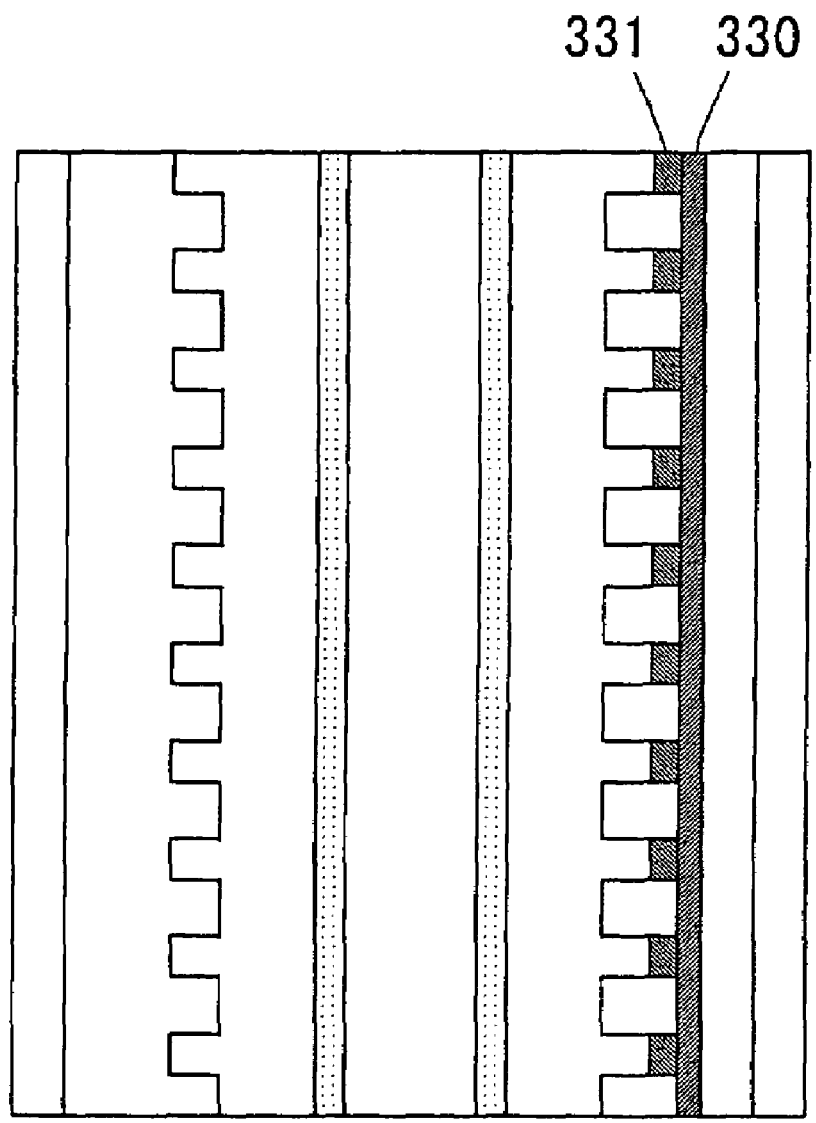
FIG. 2 is a schematic diagram showing a configuration of a fuel cell in accordance with an embodiment of the present invention.

The separation membrane 330 and the diffusion layer 110 can be joined to each other using, for example, a synthetic-rubber-based adhesive, a vinyl-chloride-based adhesive, an epoxy-based adhesive, and a urethane-based adhesive. In the process, if all the surface of the separation membrane 330 is coated with the adhesive, the oxygen permeability of the separation membrane 330 is reduced or lost. Therefore, the surface of the diffusion layer 110 is coated with the adhesive. The diffusion layer 110 is a porous member, and hence its surface is not smooth, but has depressions and projections as shown in FIG. 2. Consequently, by coating the adhesive on the surface of the diffusion layer 110, the separation membrane 330 can be fixed onto the diffusion layer 110 while areas to which the adhesive 331 is not applied are secured on the surface of the separation membrane 330 as shown in FIG. 2. Therefore, the oxygen permeability of the separation membrane 330 can be secured.

Besides, the separation membrane 330 can also be fixed onto the diffusion layer 110 without using any adhesive, namely, through thermal fusion by heating the separation membrane 330.

In the embodiment, description has been given of a configuration in which the separation membrane 330 is disposed adjacent to the diffusion layer as shown in FIG. 1, but the configuration is not restricted by the embodiment. For example, it is possible to dispose a separation membrane near the origin of the oxidant passage 312 so as to obstruct the passage to increase the oxygen density of the oxidant 126 flowing into the passage 312.

EXAMPLE 1

Referring now to FIG. 1, example 1 will be described. In a fuel cell of this example, the separation membrane 330 including polydimethylsiloxane is disposed on the cathode electrode 108.

As the catalyst contained in the anode electrode side catalyst layer 106 and the cathode electrode side catalyst layer 112, there were adopted catalyst carrying carbon particles produced by making carbon fine particles (Denka Black made by Denki Kagaku Kogyo Kabushiki Kaisha) carry particles having a diameter of 3 to 5 nm of a platinum (Pt)-ruthenium (Ru) alloy at 50 wt %. Incidentally, the alloy composition was 50 at % Ru, and the percentage by weight between the alloy and the carbon fine particles was 1:1. To one gram of the catalyst carrying carbon fine particles, 18 ml of 5 wt % Nafion solution made by Aldrich Chemical Co. Inc. was added, and the mixture was stirred by an ultrasonic mixer for three hours at 50° C. into a catalyst paste. On carbon paper (TGP-H-120 made by Toray Industries, Inc.) which had undergone water repellent treatment with polytetrafluoroethylene, the paste was coated at 2 mg/cm² by screen printing and dried at 120° C. to produce the anode electrode 102 and the cathode electrode 108.

Next, onto one polymer electrolyte film 114 (Nafion (registered trademark) made by DuPont, film thickness=150 μm), the anode electrode 102 and the cathode electrode 108 obtained as above were hot-pressed at 120° C. to fabricate a unit cell.

A synthetic-rubber-based adhesive was coated on the surface of the diffusion layer 110, and the separation membrane 330 was placed on the coated surface and then the diffusion layer 110 was joined with the separation membrane 330. The material of the separation membrane 330 was Silastic (registered trademark) manufactured by Dow Coning Corporation, and the separation membrane had a thickness of 0.1 μm.

When 10% methanol aqueous solution was fed to the anode electrode of the cell at 2 ml/min, an open-circuit voltage of 0.9 V and a short-circuit current of 0.30 A/cm² were observed.

EXAMPLE 2

In a fuel cell of this example, the separation membrane 330 including a polyimide-based material is disposed on the cathode electrode 108. Capton (registered trademark, film thickness=7.5 μm) manufactured by DuPont-Toray Co., Ltd. was adopted as the separation membrane 330. The other configurations were the same as those of the fuel cell of example 1.

When 10% methanol aqueous solution was supplied to the anode electrode of the cell at 2 ml/min, an open-circuit voltage of 0.9 V and a short-circuit current of 0.25 A/cm² were observed.

COMPARISON EXAMPLE

The fuel cell of this comparison example has a configuration obtained by removing the separation membrane 330 from the fuel cell of the above example. The other configurations were the same as those of the fuel cell of the example. When 10% methanol aqueous solution was supplied to the anode electrode of the fuel cell at 2 ml/min, an open-circuit voltage of 0.8 V and a short-circuit current of 0.10 A/cm² were observed.

According to the data of the fuel cells of examples 1 and 2 and comparative example, it is to be appreciated that the output characteristics of the fuel cells of the examples 1 and 2 are superior to that of the fuel cell of comparative example. It can be considered that this is because the oxidant having a higher oxygen density is supplied by the separation membrane 330 in the fuel cells of the examples 1 and 2. Particularly, the fuel cell of example 1 produces power which is one and half times that of the fuel cell of the comparison example. It can be considered that this is because the cell is provided with the separation membrane 330 including a polysiloxane-based material and hence air containing high-density oxygen is supplied to the cathode electrode and excessive water is efficiently removed from the cathode electrode, and as a result, the chemical reaction is smoothly conducted on the cathode electrode.

INDUSTRIAL APPLICABILITY

As set forth hereinabove, in accordance with the present invention, by disposing an separation membrane including a material with an oxygen/nitrogen separation coefficient more than one, there can be provided a liquid fuel supply type fuel cell capable of supplying sufficient oxygen to the cathode electrode.

The invention claimed is:
1. A liquid fuel supply type fuel cell, comprising:
a solid electrolyte film,
an anode electrode disposed on one surface of the solid electrolyte film, a cathode electrode disposed on the other surface of the solid electrolyte film, and a passage for feeding air to the cathode electrode, wherein a separation membrane including a material having an oxygen/nitrogen separation coefficient more than one is disposed between the cathode electrode and the passage, and wherein the separation membrane covers an entire surface of the cathode electrode.

2. The liquid fuel supply type fuel cell in accordance with claim 1, wherein the separation membrane is a polysiloxane-based polymer film or a polyimide-based polymer film.

3. The liquid fuel supply type fuel cell in accordance with claim 1, wherein the separation membrane is a polyorganosiloxane-based polymer film.

4. The liquid fuel supply type fuel cell in accordance with claim 1, wherein the separation membrane includes a material having an oxygen/nitrogen separation coefficient equal to or more than two.

5. The liquid fuel supply type fuel cell in accordance with claim 1, wherein the separation membrane includes a material having a water vapor transmission coefficient equal to or more than $0.6 \times 10^{-6}$ cm$^3$(STP) cm/cm$^2$·sec·cmHg.

6. The liquid fuel supply type fuel cell in accordance with claim 1, wherein the liquid fuel supplied to the anode electrode is methanol.

7. A liquid fuel supply fuel cell, comprising:

a layer of solid electrolyte film;

an anode electrode formed as a layer on one surface of the solid electrolyte film;

a cathode electrode formed as a layer on an opposing surface of the solid electrolyte film;

a separation membrane including a material having an oxygen/nitrogen separation coefficient more than one formed as a layer on said cathode electrode;

a separator spaced apart by a space from said separation membrane; and a passage for feeding air to the cathode electrode formed in said space between said separation membrane and said separator.

8. The liquid fuel supply fuel cell in accordance with claim 7, wherein the separation membrane is a polysiloxane-based polymer film or a polyimide-based polymer film.

9. The liquid fuel supply fuel cell in accordance with claim 7, wherein the separation membrane is a polyorganosiloxane-based polymer film.

10. The liquid fuel supply type fuel cell in accordance with claim 7, wherein the separation membrane includes a material having an oxygen/nitrogen separation coefficient equal to or more than two.

11. The liquid fuel supply type fuel cell in accordance with claim 7, wherein the separation membrane includes a material having a water vapor transmission coefficient equal to or more than $0.6 \times 10^{-6}$ cm$^3$ (STP) cm/cm$^2$·sec·cmHg.

12. The liquid fuel supply type fuel cell in accordance with claim 7, wherein the liquid fuel supplied to the anode electrode is methanol.

13. A liquid fuel supply fuel cell, comprising:

a solid electrolyte film;

an anode electrode disposed on one surface of the solid electrolyte film;

a cathode electrode disposed on an opposing surface of the solid electrolyte film;

a separation membrane including a material having an oxygen/nitrogen separation coefficient more than one is overlying and in direct contact with the cathode electrode; and a passage overlying the separation membrane for feeding air to the cathode electrode, so that said separation membrane is between said cathode electrode and said passage.

* * * * *

UNITED STATES PATENT AND TRADEMARK OFFICE
CERTIFICATE OF CORRECTION

PATENT NO. : 7,655,343 B2 Page 1 of 1
APPLICATION NO. : 10/528337
DATED : February 2, 2010
INVENTOR(S) : Obata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1356 days.

Signed and Sealed this

Fourth Day of January, 2011

David J. Kappos
*Director of the United States Patent and Trademark Office*